United States Patent [19]

Bell

[11] 4,300,227
[45] Nov. 10, 1981

[54] REPLICABLE OPTICAL RECORDING MEDIUM

[75] Inventor: Alan E. Bell, East Windsor, N.J.

[73] Assignee: RCA Corporation, New York, N.Y.

[21] Appl. No.: 85,546

[22] Filed: Oct. 17, 1979

[51] Int. Cl.³ .......................... G11B 7/26; G11B 7/24
[52] U.S. Cl. ...................................... 369/84; 369/275; 369/100
[58] Field of Search ................ 179/100.1 G, 100.3 V, 179/100.1 B; 358/128.5, 128.6, 127; 346/762, 108, 135.1; 365/215, 234, 127, 124, 121, 122; 369/84, 94, 275, 85, 100

[56] References Cited

U.S. PATENT DOCUMENTS

| | | | |
|---|---|---|---|
| 3,636,526 | 1/1972 | Feinleib | 179/100.3 V |
| 3,842,194 | 10/1974 | Clemens | 179/100.1 B |
| 4,069,487 | 1/1978 | Kasai et al. | 346/76 L |
| 4,097,895 | 6/1978 | Spong | 179/100.3 V |
| 4,101,907 | 7/1978 | Bell et al. | 346/135 |

OTHER PUBLICATIONS

Palermo et al., *Optics and Laser Technology*, Aug. 1977, p. 169.

*Primary Examiner*—Bernard Konick
*Assistant Examiner*—Donald McElheny, Jr.
*Attorney, Agent, or Firm*—Birgit E. Morris; William J. Burke

[57] ABSTRACT

An optical recording medium which comprises a light reflective layer, a light transmissive layer and a light absorptive layer where the light transmissive layer is comprised of an organic material which has a melting, sublimation or decomposition temperature at least 300° C. less than that of the material comprising the absorptive layer and where the absorptive layer has a melting temperature of at least 1000° C. Information is recorded as bubbles in the absorptive layer. This storage mechanism produces topographical features which are suitable for replication, thus allowing direct replication of the recorded information.

25 Claims, 4 Drawing Figures

REPLICABLE OPTICAL RECORDING MEDIUM

This invention relates to an optical recording medium which has improved recording sensitivity and which can be replicated without further processing steps.

BACKGROUND OF THE INVENTION

Spong, in U.S. Pat. No. 4,097,895 which issued June 27, 1978, has disclosed an ablative optical recording medium for use in an optical recording system, which medium comprises a light reflective material which is coated with a layer of a light absorptive organic material. A focused, modulated light beam, such as a light beam from an argon ion laser, when directed at the recording medium, vaporizes or ablates the light absorptive layer, leaving an opening in this layer and exposing the light reflecting material. The thickness of the light absorptive layer is chosen so that the reflectivity of the recording medium is reduced.

Bell, in a co-pending application, Ser. No. 054,437 filed July 3, 1979, which is a continuation of Ser. No. 782,032 filed Mar. 28, 1977, now abandoned, has disclosed an improved ablative trilayer optical recording medium for use in the Spong optical recording system. The trilayer optical recording medium comprises a light reflective material, a layer of a light transmissive material overlying the light reflective material and a layer of a light absorptive material overlying the light transmissive layer. The thickness of the light absorptive layer is so related to the thickness of the light transmissive layer and the optical constants of the light reflective material and the transmissive and absorptive layers, so as to reduce the optical reflectivity of the recording medium. A maximum fraction of light impinging on the recording medium from a focused, modulated light beam, is then absorbed and converted to thermal energy in the light absorbing layer. The thermal energy ablates or melts the light absorptive layer producing an opening in the layer and thus exposing the underlying light reflecting layer through the light transmissive layer.

The reflectivity in the area of the opening of the light absorptive layer is essentially that of the light reflective layer and is much greater than that of the surrounding unexposed region. During readout this difference in reflectivities is detected optically and converted into an electrical signal representative of the recorded information.

Bell, in a copending application entitled "Replicable Optical Recording Medium", Ser. No. 085,547 filed October 17, 1979 has disclosed an optical recording medium comprising a light reflective layer, a light transmissive layer and a light absorptive layer where the material comprising the light transmissive layer melts, sublimes or decomposes at a temperature at least 300° C. less than that of the material which comprises the light absorptive layer. Information is recorded as openings in both the light transmissive and light absorptive layers or as bubbles in the light absorptive layer. These storage mechanisms produce topographical features which are suitable for replication, thus allowing the replication of the recorded information without additional processing steps. This recording mechanism was observed to improve the signal-to-noise performance of the recording medium for incident light beam powers just above the threshold for recording.

The cost and complexity of an optical recording system is greatly affected by the light power required to record information at an acceptable signal-to-noise ratio. Therefore, it would be desirable to have a recording medium for which the light power required to record information at an acceptable signal-to-noise ratio is significantly less than that required by the optical recording media disclosed by Bell, which decreases the cost of the system.

SUMMARY OF THE INVENTION

An optical recording medium comprises a light reflective layer, a light transmissive layer and a light absorptive layer, where the light transmissive layer is comprised of an organic material which melts, decomposes or sublimes at a temperature at least 300° C. less than the melting temperature of the material which comprises the light absorptive layer and which reduces the light power required for recording. Information is recorded in the recording medium in the form of bubbles in the light absorptive layer. The invention also includes a method for replication of information, recorded in an optical recording medium in the form of topographical features, without additional processing steps.

DETAILED DESCRIPTION OF THE INVENTION

Figure 1:
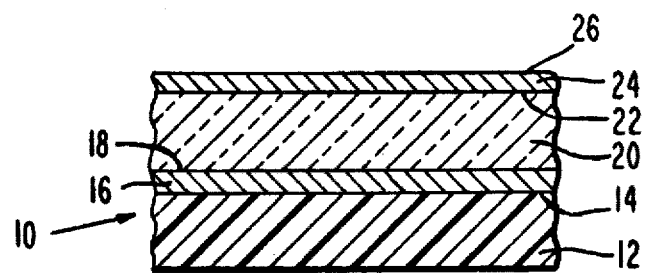
FIG. 1 is a schematic illustration of a cross-sectional view of an optical recording medium.

FIG. 1 is a schematic illustration of a cross-sectional view of a recording medium 10 of the invention. The optical recording medium 10 comprises a substrate 12 having a surface 14, a light reflecting layer 16 having a surface 18 overlying the surface 14 of the substrate 12, a light transmissive layer 20 having a surface 22 overlying the surface 18 of the light reflective layer 16 and a light absorptive layer 24 having a surface 26 overlying the surface 22 of the light transmissive layer 20.

Figure 2:
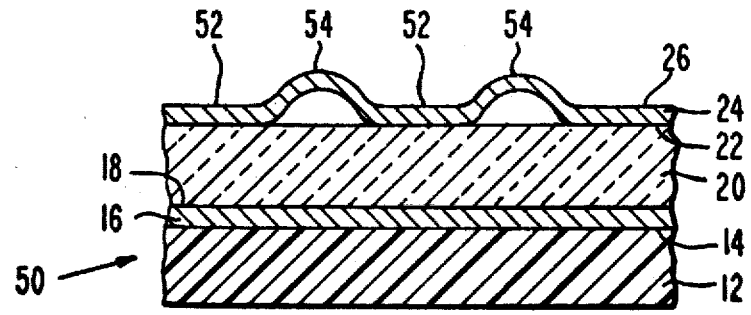
FIG. 2 is a schematic illustration of a cross-sectional view of an optical recording medium with information recorded therein in the form of bubbles in the light absorptive layer.

FIG. 2 is a schematic illustration of a cross-sectional view of a recording medium 50 of the invention in which information has been recorded. The identification of the layers of the recording medium correspond to those of FIG. 1. The information has been recorded in the form of a series of bubbles 54 in the light absorptive layer 24. Typically information is recorded by varying the length of the bubbles 54 and the unexposed areas 52 between the bubbles 54 along the direction of a track. The length of the bubbles 54 is determined by the length of time the recording medium is exposed to the recording light beam and the speed at which the medium is moving through the focal plane of the recording light beam.

The substrate 12 may be formed of glass or plastic material, such as polyvinyl chloride, typically in the form of a disk. Alternatively, the substrate 12 may also be formed of a material such as aluminum which reflects light at the recording wavelength thus combining the functions of the substrate 12 and the light reflective layer 16. A substrate, if present, need only be thick enough to support the remainder of the structure.

Since any roughness of the surface 14 of the substrate 12 on the scale of the focused light beam diameter will produce noise in the signal channel during readout, a non-conformal coating of a plastic material, such as an epoxy resin, on the surface 14 prior to formation of the light reflective layer 16 thereon will produce a microscopically smooth surface eliminating this noise source.

The light reflective layer 16 reflects a substantial fraction of the incident light at the recording wavelength and is typically formed of the metal such as aluminum or gold which exhibits high reflectivity. Preferably the light reflective layer reflects at least 50% of the incident light. The reflective layer 16, which is typically about 30 to 60 nanometers thick, may be deposited on the surface 14 of the substrate 12 using vacuum evaporation techniques.

The present invention lies in the use of organic materials, which are substantially transparent at the recording and readout wavelengths, which can form a smooth coating substantially free of defects when deposited on the light reflective layer using evaporation, spin coating or glow discharge deposition techniques, and which preferably melts, sublimes or decomposes at a temperature at least 300° C. less than the temperature at which the material comprising the light absorptive layer melts, as the light transmissive layer 20 in combination with a high melting temperature light absorptive layer. The use of an organic material would be expected to lead to about a factor of two reduction in the threshold recording power as compared to an inorganic material such as silicon dioxide or magnesium fluoride, due to the lower thermal diffusivity of the organic material. This result is in fact found for a recording medium comprising an organic material as the transmissive layer and a low melting temperature material, such as tellurium, as the absorptive layer.

However, when a high melting temperature material such as titanium is used for the absorptive layer, there is a reduction on the order of a factor of four in the threshold recording power. A rapid increase in the recording medium performance as determined from the signal-to-noise ratio for recording powers just above the threshold power is observed. This latter result indicates, as will be shown in the Examples, that for a recording medium having a high melting temperature material, such as titanium as the absorptive layer and a suitable organic material as the transmissive layer, a factor of five to six less light power incident on the disk is required to obtain a signal-to-noise ratio in excess of 40 dB on readout. These results were unexpected.

Suitable materials for the light transmissive layer of the invention include polymerized hydrocarbons, fluorocarbons and chlorocarbons, thermoplastics and monomers such as sucrose benzoate and sucrose octoacetate.

Examination of recorded tracks with a scanning electron microscope shows that bubbles are formed in the light absorptive layer when this layer is composed of a high melting temperature, as compared to a low melting temperature material.

From these observations it appears that, if the organic material which comprises the light transmissive layer decomposes or sublimes before the light absorptive layer melts, the pressure of the trapped gases will cause a bubble to form in the absorptive layer. If, however, the absorptive layer melts before the transmissive layer decomposes or sublimes then a pit rather than a bubble will be formed. In the first case a further increase in sensitivity will be observed because the absorptive layer does not have to melt.

The preferred thickness of the light transmissive layer is then a compromise between the thickness required to produce a reduced reflectivity for the recording medium as a whole and the thickness required by thermal considerations to permit the light transmissive layer to decompose or sublime. A thickness of the light transmissive layer between about 10 nanometers and about 500 nanometers is useful. A thickness between about 30 nanometers and about 100 nanometers is preferred.

The light absorptive layer 24 is formed of a material which absorbs light at the recording wavelength and which has a melting temperature significantly higher than the decomposition or sublimation temperature of the material which comprises the light transmissive layer. Materials having a melting temperature greater than 1000° C. are suitable. Materials having a melting temperature greater than about 1400° C. are preferred. Suitable materials include, but are not limited to, titanium, platinum, rhodium, gold, nickel, chromium, manganese and vanadium, which may be deposited using standard evaporation or electron beam evaporation techniques. Thicknesses for the absorptive layer between about 2 nanometers and 25 nanometers are suitable. After exposure to the atmosphere, some of these materials will partially oxidize leaving an absorbing layer which is thinner than the layer originally deposited. This effect may be compensated for by depositing a layer which is thicker than that desired with the subsequent oxidation reducing the effective thickness of this layer to the desired value. The thicknesses of the absorptive layer discussed or claimed below are the desired values.

To eliminate or reduce signal defects caused by surface dust which precipitates from the environment, an overcoat layer of about 0.05 to about 1 millimeter thick is applied to the light absorptive layer. Dust particles which settle on the upper surface of the overcoat layer are far removed from the focal plane of the optical system so that the effect on the recording or readout of information is considerably reduced. A useful material for this application is a silicone resin. If the information in a recording medium is to be replicated the overcoat layer is not used.

The recording process illustrated in FIG. 2 differs markedly from that of the prior art recording medium which is typically comprised of an aluminum light reflective layer, a silicon dioxide light transmissive layer, and a titanium or tellurium light absorptive layer. In that medium, the information is recorded by the formation of openings in the absorptive layer only.

The improvements in the threshold for recording and the performance on readout at recording powers just above threshold, which are attained using the recording medium of the invention, have significant implications for an optical recording system. In particular, the recording medium of the invention can be used in an optical recording system which uses a directly modulated, solid state injection laser as the light source. Prior art titanium media require a large, high powered laser, such as an argon ion laser, and a separate light beam modulator which greatly increase the cost, size, and complexity of the optical recording system.

Recording media of the invention in the form of disks were tested by recording video information with a signal bandwidth of 0 to about 4.2 megahertz encoded on a frequency modulated carrier with a deviation from about 7 megahertz to about 10 megahertz. The quality of the recordings made using modulated argon ion laser were evaluated by measuring the signal-to-noise ratio of the readout video information as a function of the incident power on the disk.

The signal-to-noise ratio on readout is defined as the ratio of the peak-to-peak video signal to the root mean square noise in the full video bandwidth as measured by a model 1430 random noise measuring set manufactured by the Tektronix Corp., Beaverton, Oregon.

EXAMPLE NO. 1

Figure 3:
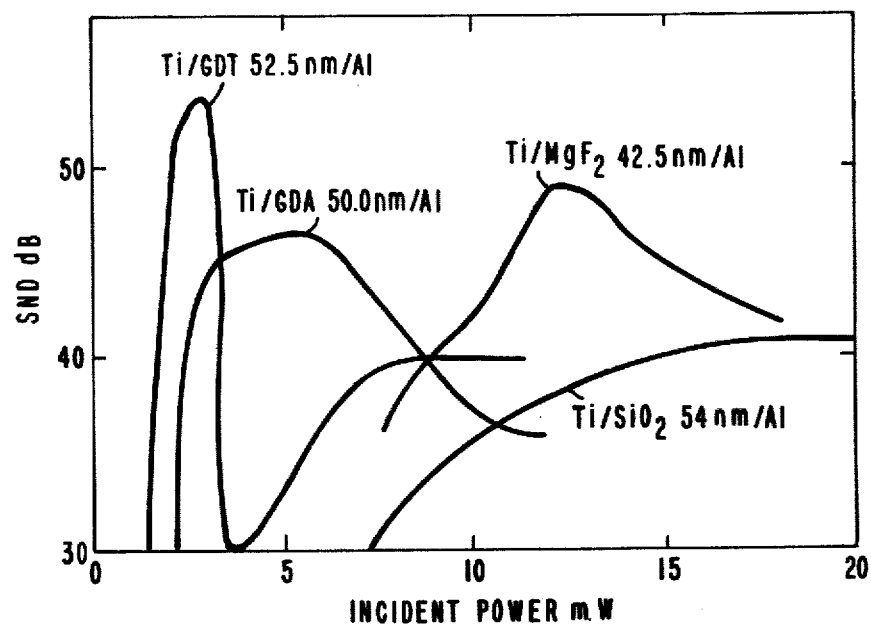
FIG. 3 is a graph of the playback signal-to-noise performance of an optical recording medium of the invention and a prior art optical recording medium as a function of light power incident on the recording medium.

FIG. 3 illustrates the recording behavior, by the curve labeled Ti/GDT 52.5 nm/Al, of a recording medium comprised of an aluminum light reflective layer, a light transmissive layer comprised of a fluorocarbon polymer, about 52.5 nanometers thick, deposited on the light reflective layer, and a titanium light absorptive layer about 7 nanometers thick. Also shown in the Figure is the recording behavior of similar recording media, except having a silicon dioxide or magnesium fluoride light transmissive layer.

The fluorocarbon is a highly cross-linked polymer deposited by plasma polymerization of 1,3-perfluorodimethyl cyclohexane on a disk. The disk ras rotated between two electrodes between which a glow discharge was initiated. A magnetic field in the region of the electrodes was used to confine the glow discharge. A continuous flow into the discharge region of the 1,3-perfluorodimethyl cyclohexane in a nitrogen carrier gas, was maintained during deposition.

Information was recorded on this disk as described above. The threshold recording power for the disk with the fluorocarbon transmissive layer was 1.5 milliwatts of incident light power. For comparison the threshold was 7 milliwatts for a disk having a silicon dioxide transmissive layer and 6 milliwatts for a disk having a magnesium fluoride transmissive layer. Thus, a factor of four reduction in threshold power requirements was found as compared with the prior art.

The incident light power to attain a signal-to-noise ratio greater than 40 dB was 1.8 milliwatts for the disk having a fluorocarbon transmissive layer while 9 milliwatts and 15 milliwatts were required for disks having a magnesium fluoride and silicon dioxide transmissive layer respectively. Thus, there is a factor of at least five improvement in the performance of the recording medium having a fluorocarbon transmissive layer as compared to other known recording media when a 40 dB signal-to-noise ratio is the criterion for acceptable performance.

EXAMPLE NO. 2

FIG. 3 illustrates the recording behavior, by the curve labeled Ti/GDA 50 nm/Al, of a recording medium comprised of an aluminum light reflective layer, a light transmissive layer comprised of a hydrocarbon about 50 nanometers thick, and a titanium light absorptive layer about 7 nanometers thick.

The hydrocarbon polymer light transmissive layer was formed according to the same glow discharge technique as used in Example 1 except that the 1,3-perfluorodimethyl cyclohexane was replaced by acetylene.

Information was recorded on this disk as described above. The threshold recording power was measured to be 2.1 milliwatts and the incident power to attain a signal-to-noise ratio of 40 dB was 2.5 milliwatts. The threshold recording power is at least a factor of three less than other known recording media and the incident power to attain a 40 dB signal-to-noise ratio is at least about a factor of about four less.

EXAMPLE NO. 3

Figure 4:
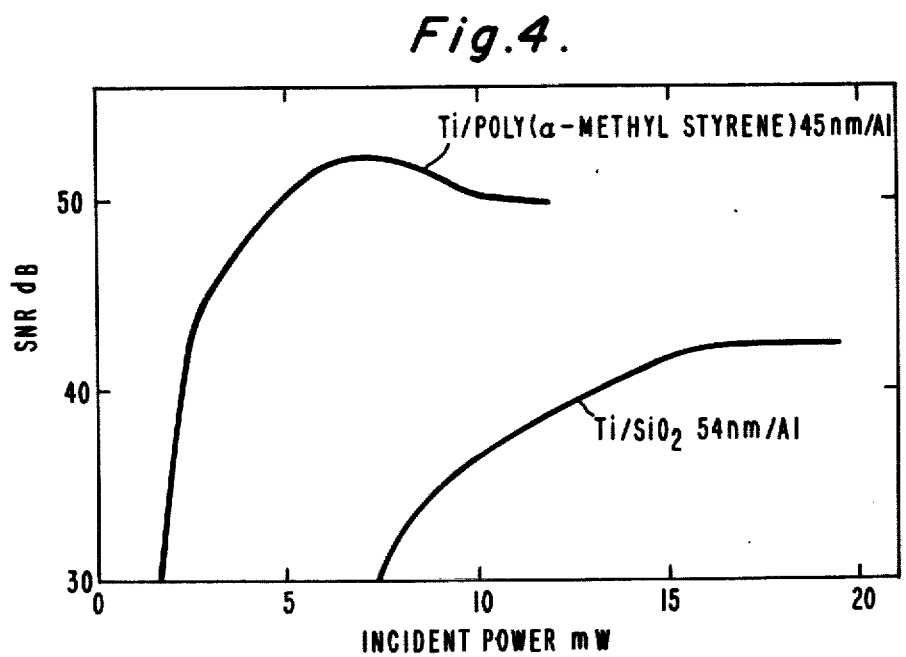
FIG. 4 is a graph of the playback signal-to-noise performance of an optical recording medium of the invention and an optical recording medium of the prior art as a function of light power incident on the recording medium.

FIG. 4 illustrates the recording behavior for a recording medium having an aluminum light reflective layer, a light transmissive layer comprised of poly($\alpha$-methyl styrene) about 45 nanometers thick and a titanium light absorptive layer about 7 nanometers thick. Also shown in the Figure is the recording behavior of a recording medium having a silicon dioxide light transmissive layer.

The poly($\alpha$-methyl styrene) was deposited on the light reflective layer by spin coating a disk at 450 rpm from a solution of 1.3% by weight of poly($\alpha$-methyl styrene) in toluene.

Information was recorded on this disk as described above. A threshold recording power of 1.7 milliwatts and a recording power of 2.2 milliwatts to attain a 40 dB signal-to-noise ratio were measured. These results are similar to those obtained for a fluorocarbon and hydrocarbon transmissive layer and are lower than other known recording media.

EXAMPLE NO. 4

A reduction of a factor of two in the threshold recording power is to be expected when a silicon dioxide light transmissive layer is replaced by an organic material because the thermal diffusivity of the organic material is about a factor of six less than that for the silicon dioxide. Two disks having a tellurium absorptive layer were prepared; the first having a silicon dioxide transmissive layer and the second a fluorocarbon prepared as described in Example No. 1. The threshold recording power was measured to be 2 milliwatts for the disk having the silicon dioxide transmissive layer and 1 milliwatt for the disk having the fluorocarbon transmissive layer. This result is consistent with the decreased thermal diffusivity.

This experiment was repeated using titanium instead of tellurium for the absorptive layer. In this case the threshold recording power was 7 milliwatts for the disk having the silicon dioxide transmissive layer and 1.7 milliwatts for the disk having the fluorocarbon transmissive layer. This is a reduction of a factor of four in the threshold power; a factor of two greater than expected.

Examination of the tellurium and titanium disks with a scanning electron microscope showed that in both cases the tellurium absorptive layer melted to form openings where struck by the light. The titanium absorptive layer behaved differently. It melted when a silicon dioxide transmissive layer was used, but formed a bubble when the fluorocarbon transmissive layer was used, as powers less than about 4 milliwatts. The unexpected improvement in the threshold recording power arises from this new recording mechanism.

Using the recording medium of the invention information is recorded in the form of topographical features of a magnitude suitable for replication. Replicas of the information so recorded can be made using techniques standard in the art.

After the information is recorded a coating layer is formed on the surface of the recording medium in which the information is recorded. The coating layer may be formed by evaporation of materials such as gold or copper or electroless plating of a material such as nickel. The coating layer thus formed should be an electrically conducting, pinhole free, conformal layer. Typically, this layer can be between about 30 nanometers to about 120 nanometers thick.

A master layer is then formed on the surface of the coating layer using a technique such as electrodeposition. A layer of nickel or copper preferably between about 200 micrometers to about 300 micrometers thick which is both self-supporting and stress-free is then formed on the coating layer.

The master layer with the coating layer thereon is then separated from the recording medium thus producing the replica of the recorded information in topographical form suitable for further use in making copies of the recorded information.

I claim:

1. In a recording medium for use in an optical recording-readout system employing light of a certain wavelength which comprises,
    a light reflective layer which reflects light at said wavelength;
    a light transmissive layer, overlying said reflective layer, of a material which is substantially transparent at said wavelength, and has a thickness greater than about 10 nanometers; and
    a light absorptive layer overlying said transmissive layer of a material which is absorptive of light at said wavelength;
    wherein said light transmissive layer melts, sublimes or decomposes at a temperature at least 300° C. less than the melting temperature of the material which comprises said light absorptive layer;
    the improvement which comprises, the light transmissive layer being comprised of an organic material which forms a smooth coating substantially free of defects; and
    the light absorptive layer having a melting temperature greater than 1000° C.

2. A recording medium according to claim 1 wherein the thickness of said light transmissive layer is between about 10 nanometers and about 500 nanometers.

3. A recording medium according to claim 1 wherein the thickness of said light transmissive layer is between about 30 nanometers and about 100 nanometers.

4. A recording medium according to claim 1 wherein said light transmissive layer is comprised of a material selected from the group consisting of fluorocarbon and hydrocarbon polymers.

5. A recording medium according to claim 1 wherein the thickness of said light absorptive layer varies between about 2 nanometers and about 25 nanometers.

6. A recording medium according to claim 1 wherein said light absorptive layer is comprised of material selected from the group consisting of titanium, platinum, rhodium, gold, nickel, chromium, manganese and vanadium.

7. A recording medium according to claim 1 wherein said light absorptive layer has a melting temperature greater than about 1400° C.

8. A recording medium according to claim 1 wherein said light transmissive layer is selected from the group consisting of fluorocarbon and hydrocarbon polymers and said light absorptive layer is titanium.

9. In an information record for use in an optical recording and readout system employing light of a certain wavelength which comprises:
    a light reflective layer which reflects light at said wavelength;
    a light transmissive layer, overlying said reflective layer, of a material which is substantially transparent to light at said wavelength and has a thickness greater than about 10 nanometers;
    and a light absorptive layer, overlying said transmissive layer, of a material which is absorptive of light at said wavelength with an information track recorded therein;
    wherein said light transmissive layer melts, decomposes or sublimes at a temperature at least 300° C. less than the melting temperature of the material which comprises the light absorptive layer;
    the improvement which comprises,
        the light transmissive layer being comprised of an organic material which forms a smooth coating substantially free of defects; and
        the light absorptive layer having a melting temperature greater than 1000° C.

10. A recording medium according to claim 9 wherein the thickness of said light transmissive layer is between about 10 nanometers and about 500 nanometers thick.

11. An information record according to claim 9 wherein the thickness of said light transmissive layer is between about 30 nanometers and 100 nanometers.

12. An information record according to claim 9 wherein said light transmissive layer is comprised of a material selected from the group consisting of fluorocarbon and hydrocarbon polymers.

13. An information record according to claim 9 wherein the thickness of said light absorptive layer is between about 2 nanometers and about 25 nanometers.

14. An information record according to claim 9 wherein said light absorptive layer is comprised of a material selected from a group consisting of titanium, platinum, rhodium, gold, nickel, chromium, manganese and vanadium.

15. An information record according to claim 9 wherein said light absorptive layer has a melting temperature greater than about 1400° C.

16. An information record according to claim 9 wherein said information track comprises a sequence of bubbles in said absorptive layer with variations in either or both the length of the bubbles along the track and the spacing between successive bubbles being representative of the recorded information.

17. An information record according to claim 9 wherein said light transmissive layer is comprised of a material selected from the group consisting of fluorocarbon and hydrocarbon polymers and said light absorptive layer is titanium.

18. A method of replicating information recorded on a recording medium in a recording system employing a modulated light beam of a certain wavelength which comprises the steps of:

forming a recording medium which comprises a light reflective layer reflective of light at said wavelength, a light transmissive layer, overlying said reflective layer, of a material substantially transparent to light at said wavelength, which has a thickness of at least 10 nanometers, which melts, sublimes or decomposes at a temperature which is at least 300° C. less than the melting temperature of the material which comprises the light absorptive layer and is comprised of an organic material, and a light absorptive layer, overlying said transmissive layer, of a material which is absorptive of light at said wavelength and which has a melting temperature greater than 1000° C.;

exposing said recording medium to said modulated light beam to form an information track therein, wherein said information track comprises a sequence of bubbles in said absorptive layer with variations in either or both the length and spacing between successive bubbles being representative of said information;

coating the exposed surface having said bubbles therein with a conducting, conformal contact layer;

coating said contact layer with a master layer having a thickness such that said master layer coated with said contact layer is self-supporting when separated from said recording medium; and separating said master layer having said contact layer thereon, from said recording medium.

19. A method according to claim 18 wherein said light transmissive layer is comprised of a material selected from the group consisting of fluorocarbon and hydrocarbon polymers.

20. A method according to claim 18 wherein the thickness of said light transmissive layer is between about 10 nanometers and 500 nanometers.

21. A method according to claim 18 wherein said light absorptive layer is comprised of a material selected from the group consisting of titanium, platinum, rhodium, gold, nickel, chromium, manganese and vanadium.

22. A method according to claim 18 wherein the thickness of said light absorptive layer is between about 2 nanometers and 25 nanometers.

23. A method according to claim 18 wherein the melting temperature of said absorptive layer is greater than about 1400° C.

24. A method according to claim 18 wherein said coating layer is comprised of a material selected from the group consisting of gold, copper and nickel.

25. A method according to claim 18 wherein said master layer is comprised of a material selected from the group consisting of copper and nickel.

* * * * *